United States Patent [19]
Adams

[11] Patent Number: 5,791,373
[45] Date of Patent: Aug. 11, 1998

[54] FLUID SEALING DISC AND SEAT MECHANISM

[76] Inventor: John S. Adams, 48 Bigelow Ave., Apt 13, Watertown, Mass. 02172

[21] Appl. No.: 639,420

[22] Filed: Apr. 29, 1996

[51] Int. Cl.⁶ ............................................. F16K 24/04
[52] U.S. Cl. ................................. 137/469; 137/540
[58] Field of Search ........................... 137/469, 540, 137/543.23, 543.21, 511; 251/284

[56] References Cited

U.S. PATENT DOCUMENTS

| | | | |
|---|---|---|---|
| 4,022,236 | 5/1977 | Dumont et al. | 137/469 |
| 4,312,376 | 1/1982 | Allen | 137/540 |
| 5,174,327 | 12/1992 | Truax et al. | 137/469 |
| 5,215,114 | 6/1993 | Breyer | 137/469 |
| 5,251,664 | 10/1993 | Arvidsson et al. | 137/469 |
| 5,265,642 | 11/1993 | Buckminster et al. | 137/540 |
| 5,437,268 | 8/1995 | Preece | 137/469 |
| 5,520,209 | 5/1996 | Goins et al. | 137/469 |

Primary Examiner—Marguerite McMahon
Attorney, Agent, or Firm—Lambert & Garrison, PLLC; Scott B. Garrison

[57] ABSTRACT

A fluid sealing mechanism suitable for use in valves. This mechanism is capable of self aligning to ensure precise and repeatable sealing of the valve inlet to outlet. Sealing is accomplished by a plurality of standoffs on one surface which engage a plurality of corresponding grooves on another surface. Each standoff is independently adjustable in its height dimension in order to allow precise field adjustability of the sealing surfaces. This mechanism is suitable for use in pressure relief operations.

11 Claims, 2 Drawing Sheets

FLUID SEALING DISC AND SEAT MECHANISM

BACKGROUND OF THE INVENTION

The present invention relates to the field of fluid dynamics. More particularly, it relates to mechanisms capable of obstructing, retaining, or transferring fluids such as valves.

The field of fluid mechanics pertains to the transfer of fluids from one location to another, usually for the purpose of accomplishing some work or result. Valves obstruct, retain or allow transfer of a fluid from a first location to a second location. There are a vast quantity of valve designs available in the prior art. Each design is best suited for a specific range of purposes. Gate valves typically serve as flow/no-flow mechanisms, globe valves serve as fluid throttle mechanisms, check valves allow fluid flow in one direction, and pressure relief valves allow fluid pressure release where pressure reaches some undesirably high level. There are other valves which accomplish special or specific functions, but one thing all valves have in common are some form of disc and seat which working in combination serve to prevent or allow fluid flow as the case may be.

One type of valve, the pressure relief valve provides a release mechanism for an excess rise in pressure of a particular control volume. The control volume is usually a vessel, tank, or pipe system used to maintain or transfer fluids under pressure. The need for a pressure relief mechanism arises during instances when the tank is exposed to some undesirable increase in pressure. One application for pressure relief valves is on cryogenic storage tanks. In cryogenic applications such as liquid nitrogen storage, the tank is insulated to minimize heat flux. Pressure relief valves are used to protect against undue pressure created by a breakdown in the tank's insulation. If the insulation were to fail the resulting increase in temperature could cause a rupture in the tank or an explosion.

The design of a pressure relief valve depends on the specifics for a particular application. The desired operating pressure is an important specification in the valve's design. When operating pressure is reached the valve begins to allow the flow of gases out of a vessel. As the gas escapes the tank pressure decreases. An important feature of a pressure relief valve is its self-actuating capability. This capability offers versatile and dependable protection against increases in tank pressure. A tank stored for extended periods of time in a remote location can be protected without supervision or maintenance.

There are two separate sources of force present in a relief valve during operation. One is created by the tank pressure and the other is a sealing load required to balance the tank pressure load. The main difference between valve designs is the way the load is reduced. All pressure relief valves rely upon a sealing mechanism, the aforementioned disc and seat, in order to prevent fluid flow. This sealing mechanism is the primary concern in pressure relief valve design and is usually the cause for poor performance. The sealing mechanism or disc and seat are responsible for maintaining zero fluid flow through the valve while tank pressure is below the valve's rated operating pressure. For high pressure situations the valve must actuate to permit a decrease in pressure. The seat provides the surface which when in contact with the disc creates the actual seal. A washer or O-ring is often integrated into the seat because material deformation is often necessary to achieve a good seal.

In situations of over-pressurization, the fluid in the tank places pressure upon the seat attempting to dislodge the seat from the disc, this force is typically referred to as a point of thrust. When designing a valve, it is generally recommended to locate this point of thrust along or below the seat and disc contact plane. Ignoring this can result in poor valve performance including sealing mechanism vibration, fluttering, and inadequate self alignment characteristics.

Three factors are commonly involved in the design of the seat edge or sealing surface. They are angular orientation to seating plane, concavity, and width. An angled seating contact plane creates reaction forces along the seat perpendicular to the sealing surface. These forces help to correct translational misalignment of the seat and disc. Seat concavity, the second factor of concern may also be used to correct misalignment. A curved surface insures a uniform area of contact if rotation of the sealing member occurs. The third factor involved in the design of the sealing surface is the width. A sealing surface with no measurable width is known as knife edge. A knife edge design will open at a tank pressure closest to the value obtained by the dividing the load of the affected surface area of the seat. As the width is increased the stress along the sealing surface decreases reducing its sealing capability. Therefore, a knife edge is ideal. However, a knife edge design may result in stress levels greater than the materials elastic yield strength. This can crush the seat thereby preventing good performance. The optimum seat edge width will create a stress profile which is conducive to valve sealing.

SUMMARY OF THE INVENTION

In spite of the existence of prior art pressure relief valves there is still a need for a pressure relief valve capable of adequately sealing a pressure vessel. Typical improvements in valve design have focused upon reducing friction between moving parts and improving concentricity of the disc to the seat. The applicant has found that reducing friction between components does not effectively improve the performance of the valve. Improvements to concentricity would provide the desired result. Concentricity can be improved by reducing any translational misalignment of the seat to the disc. However, improving the concentricity of the valve is not a realistic solution to the problem of poor valve performance due to the inability to reduce the misalignment to a satisfactory level without increasing friction between moving parts.

Therefore the present invention seeks to correct the deficiencies in the prior art by changing the way a valve attempts to achieve sealing. Instead of trying to improve the valve's concentricity, it is accepted that perfect concentricity will not be achieved. Rather the present invention seeks to define a maximum degree of misalignment which may occur between the seat and the disc. The sealing mechanism is designed to correct for any degree of misalignment up to the defined maximum. Allowing the sealing mechanism to correct itself will improve the sealing of the valve on a repetitive basis.

The proposed solution to the above-referenced problems are applicable to all types of valves, including but not limited to pressure relief valves. Because precise and repeatable operation of pressure relief valves is critical in cryogenic applications, this invention is particularly suited for use in pressure relief valves designed for use in cryogenic applications.

It is therefore an object of the present invention to provide an improved valve mechanism suitable for use in cryogenic applications.

It is another object of this invention to provide a valve mechanism which seals a fluid properly against undesirable passage of said fluid from one location to another until some predetermined situation occurs.

It is another object of the present invention to provide a valve seat and disc assembly which seals effectively when sealing is desired and opens effectively when flow is desired with minimal valve vibration or fluttering due to the disc and seat assembly design.

It is another object of the present invention to provide an accurate and dependable pressure relief valve mechanism.

It is another object of the present invention to provide a valve seat and disc assembly suitable for use on any type of valve that avoids the problems associated with designing low friction, low misalignment sealing mechanisms.

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawings.

DETAILED DESCRIPTION OF THE PREFERRED EMBODIMENT

Figure 1:
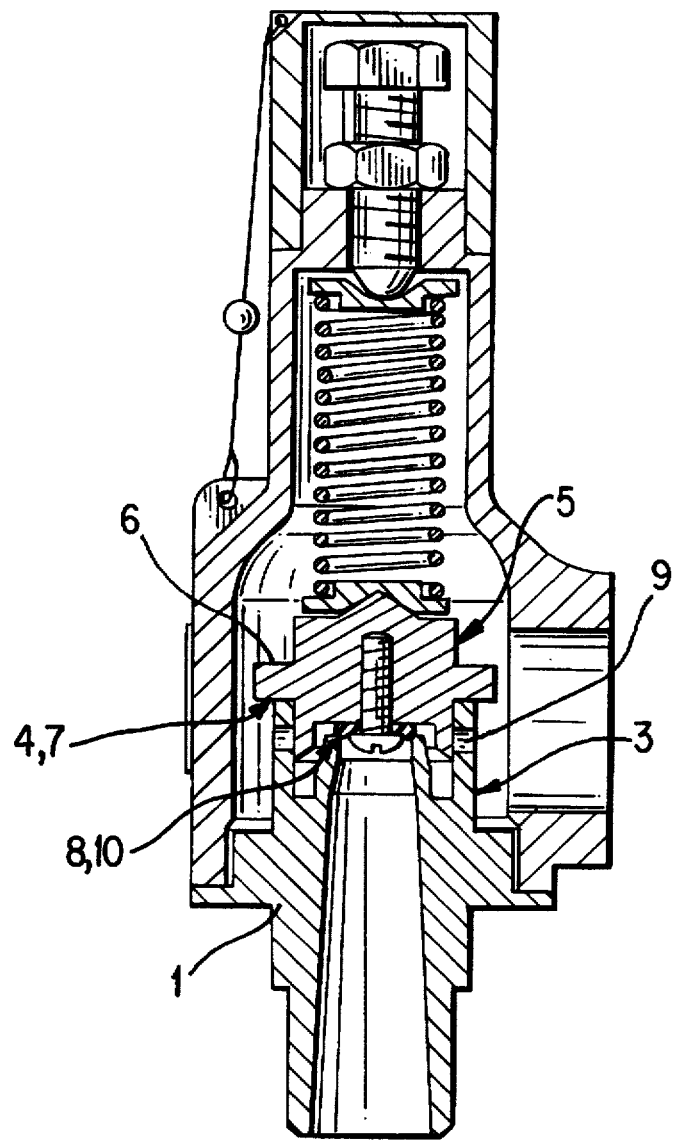
FIG. 1 is an elevation depicting a valve seat and disc assembly constructed in accordance with the present invention and located within a standard pressure relief valve.
Figure 2:
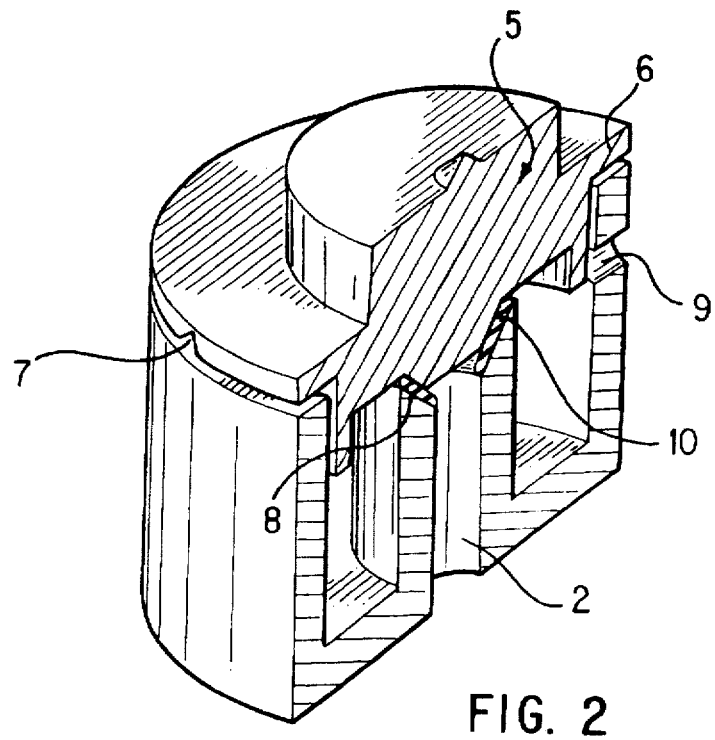
FIG. 2 is a partial cutaway view of a valve seat and disc as embodied in FIG. 1.
Figure 3:
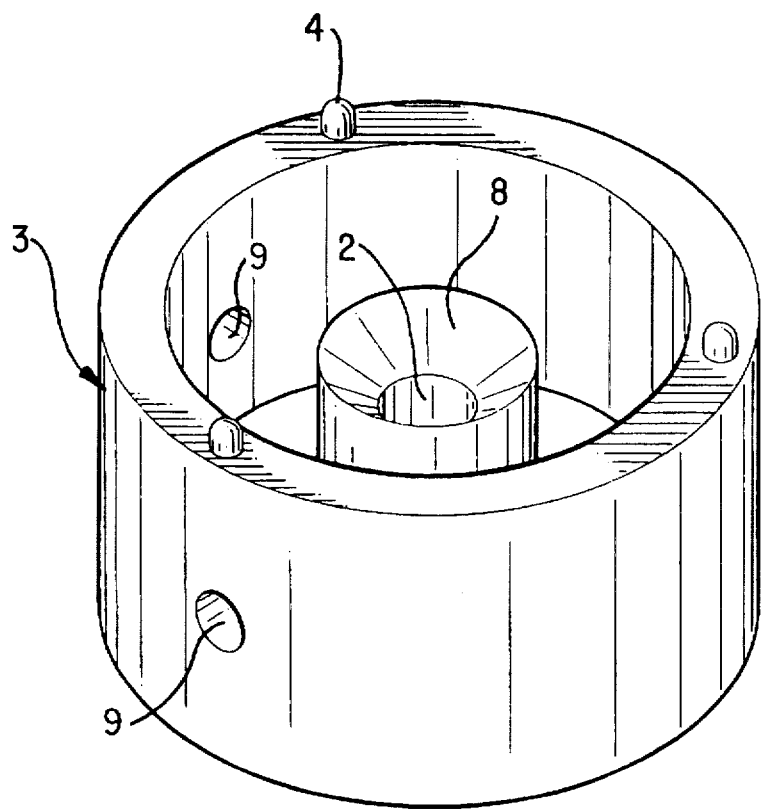
FIG. 3 is an oblique view of a valve seat as embodied in FIGS. 1 and 2.

As stated in the "Summary of the Invention" the present invention is applicable to all valves and devices meant to obstruct, retain or allow transfer of a fluid from a first location to a second location. However, the applicant's preferred embodiment of the invention is for use on pressure relief valves suitable for cryogenic applications. FIG. 1 depicts one preferred embodiment of the present invention. Item 1 refers to a valve base which is typically adapted to be mounted to pressure tanis such as a cryogenic fluid storage tank. Nozzle 2 forms a passage between a first and second environment such as between said tank and atmosphere to which a fluid contained within said tank is discharged. Collar 3 surrounds nozzle 2, the collar and nozzle form part of the base in the present embodiment. However, the collar can be a completely separate element from the base wish no resulting impact to valve operation. A plurality of standoffs 4 are attached to collar 3, said standoffs are preferably rounded and it is preferable that there be three such standoffs located at 120 intervals from each other. Each rounded standoff should be independently adjustable in a vertical direction measured from uppermost surface of the collar.

Disc 5 is constructed with flange 6 located around the outer diameter of disc 5. Flange 6 incorporates the same number of grooves 7 as there are standoffs 4. In the preferred embodiment, three grooves 7 shaped to conform to an inverted "V" correlate in position to the three rounded standoffs 4 on collar 3 of base 1. The interaction of these standoffs and grooves serve as an alignment means to ensure accurate alignment of parts to effectively seal the valve. Disc 5 is accurately positioned with respect to base 1 through alignment of the three rounded standoffs on collar 3 to the three "V" grooves on flange 6. The 120 radial spacing of the grooves and rounded standoffs allows for uniform expansion and contraction of base 1 and disc relative to each other over wide temperature variables while maintaining precise alignment. A preferred material of base 1 and rounded standoffs 4 for cryogenic applications is composite bronze however the materials selected are not a necessary feature of the invention so long as the selected materials have the capability to withstand cryogenic temperatures and applications.

Contact between disc 5 and base 1 should occur at exactly six points in the preferred embodiment. This is more commonly referred to as "kinematic coupling" or the minimum number of contact points in which all motion through "x", "y", and "z" planes can be constrained. In the present invention, each rounded standoff will contact each groove 7 at two points. Contact between three standoffs at two points with each groove equals six contact points. A sealing force is required to hold base 1 and disc 5 in contact with each other, this sealing force is applied by a loading means such as a spring. However, in non-pressure relief valves this sealing force can be provided by fluid pressure or other mechanical engagements. The amount of sealing force applied by the loading means should be adjustable in order to precisely control the conditions under which an over-pressure condition will trigger the pressure relief function. Prior art methods provide an adjustment bolt which can be adjusted to vary the spring tension of the loading means.

Proper alignment of disc 5 to base 1 enabling seat 8 to efficiently seal at nozzle 2 is accomplished by individually adjusting the relative height of each of the three rounded standoffs from the vertical surface of the uppermost surface of collar 3. Proper alignment is accomplished when the contact points between each groove and standoff permit a tight seal between a sealing means such as formed by seat 8 and nozzle 2.

The net downward force applied to disc 5 relative to base 1 by the loading means should be sufficient to allow seat 8 to engagingly seal nozzle 2, and to allow final alignment of rounded standoffs 4 to grooves 7. To better enable seat 8 to engagingly seal nozzle 2, a cryogenic compliant gasket 10 could be located on nozzle 2. Gasket 10 should be capable of deformation so as not to add a substantial contact point thereby detrimentally impacting the kinematic coupling of rounded standoffs 4 to grooves 7. On an over-pressurization event sufficient to trip the valve, the contact between the rounded standoffs and v grooves should break just prior to lifting disc 5 thereby releasing pressure. Collar 3 must allow for an exhaust means to exhaust fluid from the valve during pressure relief periods. To accomplish this, one method is to provide cutouts 9 through collar 3. Such cutouts should not occur directly beneath any of the standoffs since this could weaken the structure at points where the load will be applied.

While the invention has been described and illustrated with reference to a specific embodiment thereof, it is understood that other embodiments may be resorted to without departing from the invention. Therefore the form of the invention set out above should be considered illustrative and not as limiting the scope of the following claims.

I claim:

1. A valve mechanism comprising:
    a base, said base further comprising a passage and a collar, said passage connecting a first environment to a second environment, said collar circumferentially surrounding said passage; and
    a disc, said disc further comprising a flange and a sealing means, said sealing means capable of sealing said passage thereby preventing flow of fluid from said first environment to said second environment wherein sealing means is formed by a seat having a first surface which sealingly contacts a second surface, said second surface formed by the exit of said passage, said first surface capable of self aligning with said second surface by alignment means, wherein said alignment means comprises a plurality of grooves which align with a plurality of standoffs.

2. A valve mechanism according to claim 1 wherein each of said standoffs and each of said respective grooves corresponding to each of said standoffs are each engagingly located one upon said collar and one upon said flange.

3. A valve mechanism according to claim 2 wherein said standoffs are independently adjustable in length, said adjustability thereby enabling accurate kinematic and face to face alignment of said collar to said flange when said standoffs engage said grooves, said kinematic alignment of said collar to said flange enabling said first surface to sealingly engage said second surface.

4. A valve mechanism according to claim 3 wherein said standoffs and said grooves are equidistantly spaced circumferentially around said collar and said flange.

5. A valve mechanism according to claim 4 wherein there are three of said standoffs spaced 120 degrees apart on said collar, each standoff engages said corresponding groove located on said flange.

6. A fluid seal comprising a sealing means between a first environment and a second environment, said sealing means further comprising a first sealing surface, a second sealing surface, a first contacting surface and a second contacting surface; said first contacting surface and said second contacting surface interact to further comprise an alignment means, said alignment means capable of aligning said first sealing surface to said second sealing surface wherein said alignment means further comprises an interaction between a plurality of grooves engaging a plurality of standoffs, said standoffs each independently adjustable in height, whereby said independent adjustability of standoffs enables precise alignment of said first sealing surface to said second sealing surface, and said interaction of said grooves and said standoffs prevents misalignment of said first sealing surface with respect to said second sealing surface thereby ensuring precise and repeatable alignment characteristics between said first sealing surface and said second sealing surface.

7. A valve mechanism comprising:

at least one inlet;

at least one outlet;

a valve body; said valve body further comprising a base, said base further comprising a passage between said inlet and said outlet said base further comprising a first contacting surface;

a disc, said disc capable of placement in a first position and a second position; said first position capable of sealing said inlet from said outlet thereby blocking fluid flow from said inlet to said outlet, said second position capable of allowing fluid flow from said inlet to said outlet, said disc further comprising a second contacting surface; and a sealing force, said sealing force capable of maintaining said disc in said first position until a predetermined condition occurs wherein said first contacting surface and said second contacting surface interact to further comprise an alignment means, said alignment means capable of precisely positioning said disc in said first position, and said alignment means further comprises an interaction between a plurality of grooves engaging a plurality of standoffs, said standoffs each independently adjustable in height, whereby said independent adjustability of standoffs and said interaction of said grooves and said standoffs enables precise placement of said disc in said first position.

8. A valve mechanism as claimed in claim 7 wherein said standoffs are located on a face of a collar, said collar forming part of said base; and said grooves are located on a face of a flange, said flange forming part of said disc; wherein contact between said face of said collar and said face of said flange occurs only at said standoffs and said grooves.

9. A valve mechanism as claimed in claim 8 wherein said sealing force is provided by a loading means.

10. A valve mechanism as claimed in claim 9 suitable for use as a pressure relief valve.

11. A valve mechanism as claimed in claim 10 comprising materials suitable for use at constantly maintained cryogenic temperatures.

* * * * *